US012639611B2

(12) United States Patent
Clapis et al.

(10) Patent No.: US 12,639,611 B2
(45) Date of Patent: May 26, 2026

(54) QUANTUM STATE VECTOR IMPLEMENTATION TOOLKIT

(71) Applicant: The MITRE Corporation, McLean, VA (US)

(72) Inventors: Joe Clapis, McLean, VA (US); Richard H. Preston, McLean, VA (US); Kevin J. Bergollo Lorenzo, McLean, VA (US)

(73) Assignee: The MITRE Corporation, McLean, VA (US)

( * ) Notice: Subject to any disclaimer, the term of this patent is extended or adjusted under 35 U.S.C. 154(b) by 1081 days.

(21) Appl. No.: 17/717,874

(22) Filed: Apr. 11, 2022

(65) Prior Publication Data

US 2023/0325704 A1      Oct. 12, 2023

(51) Int. Cl.
*G06N 10/60* (2022.01)
*G06N 10/20* (2022.01)

(52) U.S. Cl.
CPC ............. *G06N 10/60* (2022.01); *G06N 10/20* (2022.01)

(58) Field of Classification Search
CPC ................................ G06N 10/60; G06N 10/20
See application file for complete search history.

(56) References Cited

U.S. PATENT DOCUMENTS

| | | | |
|---|---|---|---|
| 10,657,212 B2 | 5/2020 | Shao et al. | |
| 10,664,761 B2 | 5/2020 | Haener et al. | |
| 10,803,215 B2 | 10/2020 | Greenberg et al. | |
| 10,860,759 B2 | 12/2020 | Roetteler et al. | |
| 11,048,839 B2 | 6/2021 | Gunnels et al. | |
| 11,797,276 B1 * | 10/2023 | Shi ......................... | G06N 10/00 |
| 2018/0276014 A1 | 9/2018 | Kliuchnikov et al. | |
| 2019/0042392 A1 | 2/2019 | Matsuura et al. | |
| 2020/0174879 A1 | 6/2020 | Javadiabhari et al. | |
| 2020/0285985 A1 | 9/2020 | Javadiabhari | |

(Continued)

FOREIGN PATENT DOCUMENTS

| | | |
|---|---|---|
| JP | 4718244 B2 | 4/2011 |

OTHER PUBLICATIONS

Shao et al. (Dec. 2018). "Quantum Regularized Least Squares Solver with Parameter Estimate, " arXiv [quant-ph]. 10 pages.

(Continued)

*Primary Examiner* — Omar F Fernandez Rivas
*Assistant Examiner* — Tri T Nguyen
(74) *Attorney, Agent, or Firm* — Morrison & Foerster LLP

(57)      ABSTRACT

A method for generating a complete quantum circuit from a text-based quantum algorithm comprises receiving a text-based quantum algorithm comprising a first state vector and a second state vector, generating a first syntax tree based on the first state vector and a second syntax tree based on the second state vector, generating transition information characterizing a transition from the first state to the second state, selecting, based on the generated transition information, a type of transition that characterizes the transition from the first quantum state to the second quantum state, and generating a complete quantum circuit which indicates the first quantum state characterized by the first state vector, the selected type of transition, and the second quantum state characterized by the second state vector.

36 Claims, 10 Drawing Sheets

(56) References Cited

U.S. PATENT DOCUMENTS

2021/0124640 A1* 4/2021 Nickerson ............... G06F 11/10
2021/0319351 A1* 10/2021 Kerenidis ............... G06F 17/16

OTHER PUBLICATIONS

Yu et al. (Mar. 2019). "An improved quantum algorithm for ridge regression," arXiv [quant-ph]. 12 pages.
Chen, Y.G. et al. (Aug. 2012). "Qcompiler: quantum compilation with CSD method," 28 pages.
Evans, Daniel. "Dissecting a Quantum Program," Proceedings of Student-Faculty Research Day, CSIS, Pace University, May 4, 2018, New York, New York; 5 pages.
Inouye, Jon. (2010). "Classical and Quantum Resource Analysis for the Quantum Linear Systems Algorithm," 10th International Conference on Information Technology: New Generations (ITNG), Apr. 15-17, 2013, Las Vegas, Nevada, USA; 6 pages.
Trung, Pham Tien. (2011). "Constructing a software framework forsynthesizing high accuracy quantum circuits," 74 pages.

* cited by examiner

200

202   Receive a text-based quantum algorithm comprising a first state vector and a second state vector 204   Generate syntax trees 206   Select transition between the first state and the second state 208   Generate quantum circuit

FIG. 3

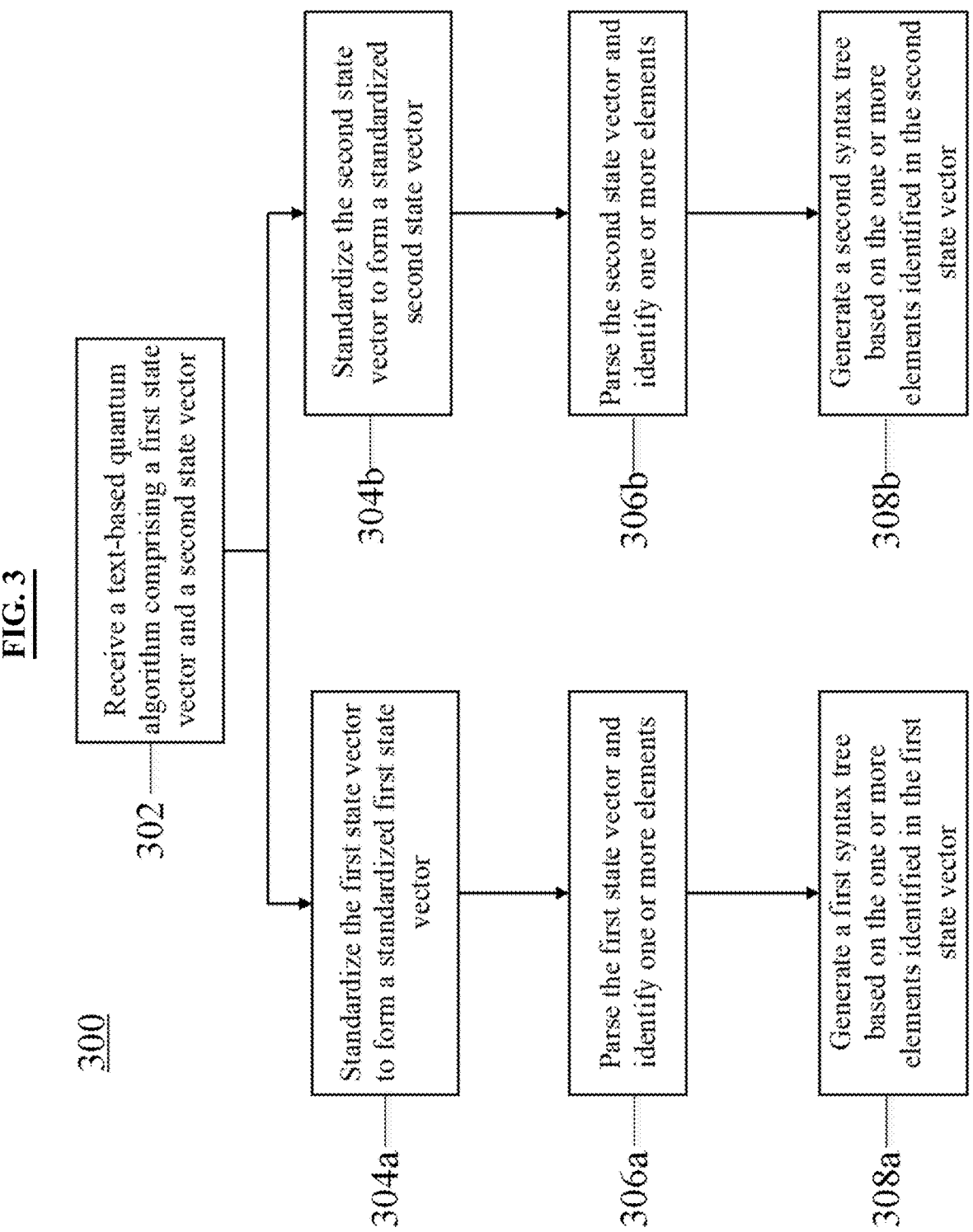

300

302 — Receive a text-based quantum algorithm comprising a first state vector and a second state vector 304a — Standardize the first state vector to form a standardized first state vector 306a — Parse the first state vector and identify one or more elements 308a — Generate a first syntax tree based on the one or more elements identified in the first state vector 304b — Standardize the second state vector to form a standardized second state vector 306b — Parse the second state vector and identify one or more elements 308b — Generate a second syntax tree based on the one or more elements identified in the second state vector

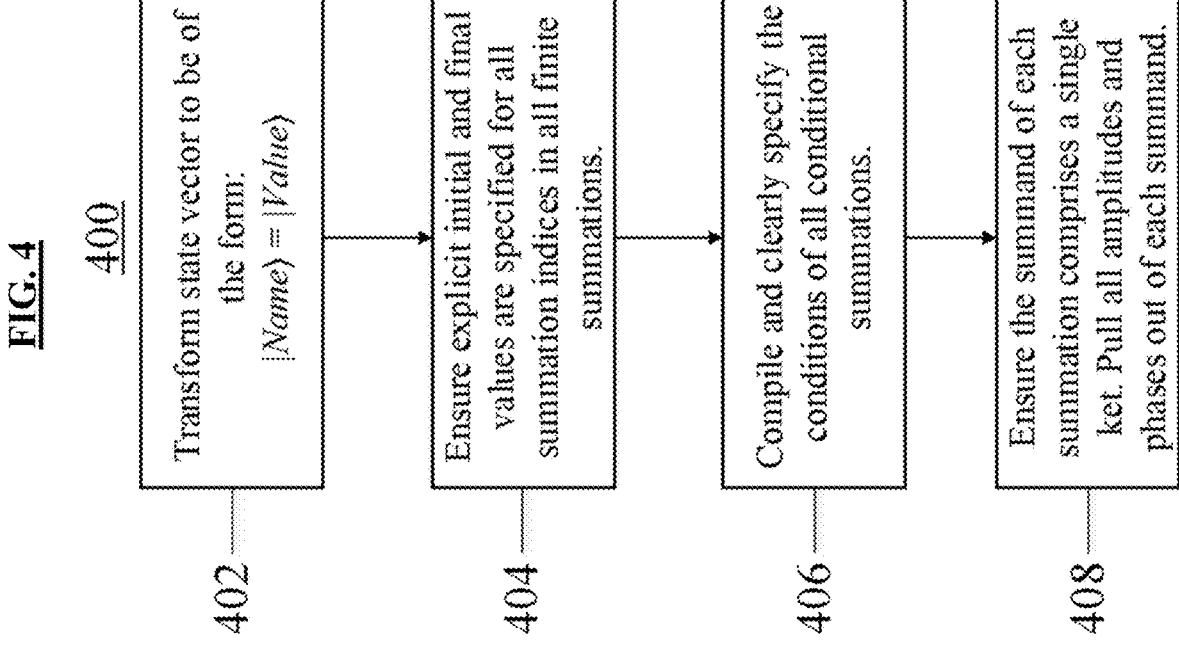

402    Transform state vector to be of the form: $|Name\rangle = |Value\rangle$

404    Ensure explicit initial and final values are specified for all summation indices in all finite summations.

406    Compile and clearly specify the conditions of all conditional summations.

408    Ensure the summand of each summation comprises a single ket. Pull all amplitudes and phases out of each summand.

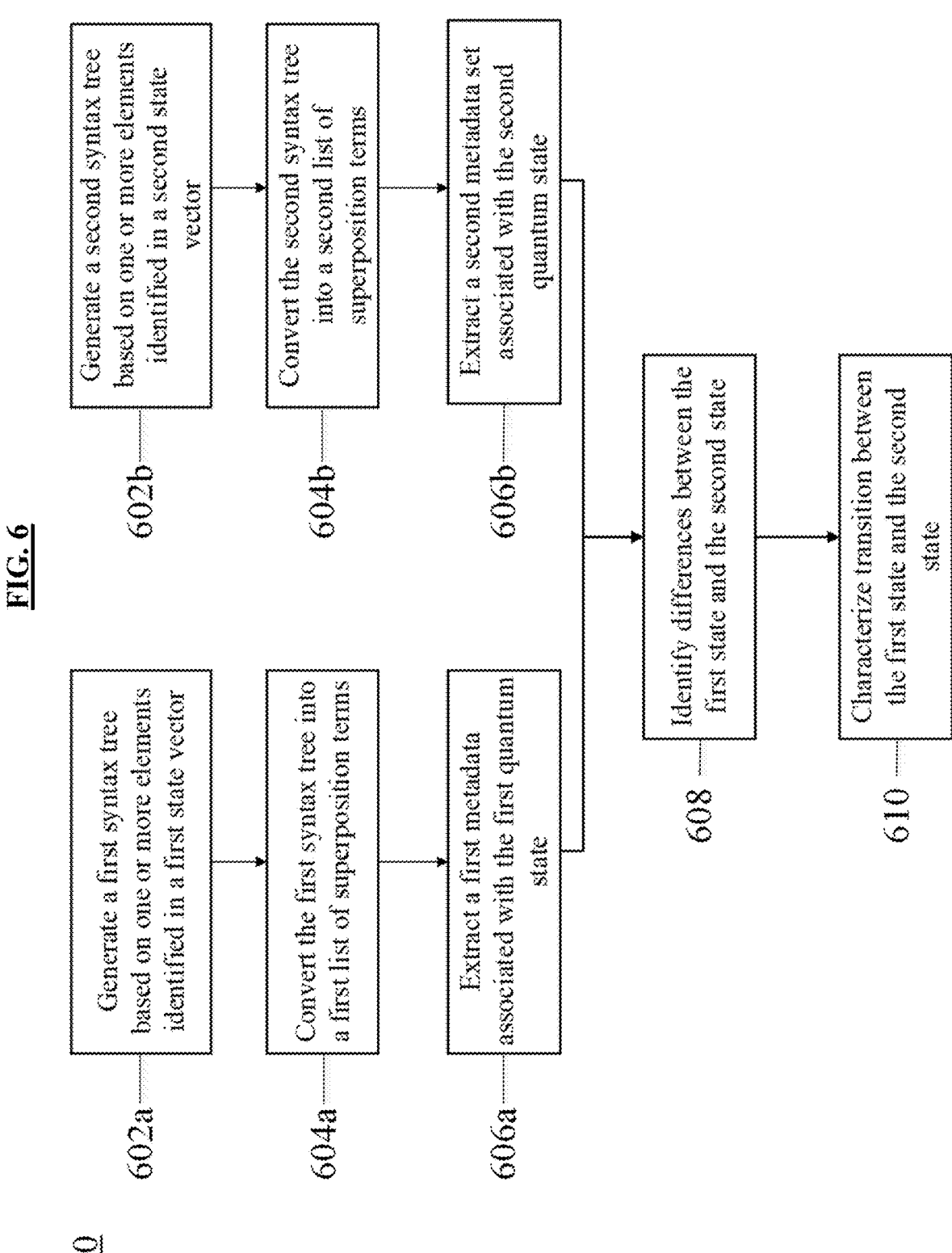

602a — Generate a first syntax tree based on one or more elements identified in a first state vector 604a — Convert the first syntax tree into a first list of superposition terms 606a — Extract a first metadata associated with the first quantum state 602b — Generate a second syntax tree based on one or more elements identified in a second state vector 604b — Convert the second syntax tree into a second list of superposition terms 606b — Extract a second metadata set associated with the second quantum state 608 — Identify differences between the first state and the second state 610 — Characterize transition between the first state and the second state

800

802  Transcribe implementation to LaTeX to generate quantum circuit in LaTeX

804  Generate PDF of quantum circuit

806  Crop PDF to remove extra whitespace

808  Convert PDF to PNG

900

902   Algorithm Name

904   Description of Algorithm

906   Register Setup g   /   Variable

New Register   Dimensions   Description   +

908   State Vector

Display of State Vector

910   Algorithm Step

Description of Step

State Vector (LaTeX)

State Vector (compiled)

912   Add New Algorithm Step   +

914   Parsed State Vector

Registers   Entanglement

Superposition

Term

916   Implementation

918   Circuit Diagrams

QUANTUM STATE VECTOR
IMPLEMENTATION TOOLKIT

FIELD

The present disclosure relates generally to quantum computing. More specifically, the present disclosure relates to techniques for generating platform-agnostic quantum algorithm implementations.

BACKGROUND

Quantum computing is a type of computation that employs physical properties of quantum states to perform calculations. The basic unit of information in a quantum computing system is the quantum bit (i.e., "qubit"), which can occupy a 0 quantum state, a 1 quantum state, or a superposition of the 0 and 1 states. As a result of their ability to harness quantum mechanical properties like superposition, quantum computers have many potential applications. In particular, quantum computers are believed to be capable of performing certain calculations much faster than classical computers. Development of quantum algorithms to solve problems on quantum computers is ongoing; however, until recently, these algorithms were studied primarily from a theoretical standpoint.

In recent years, the increased availability of quantum hardware from companies such as Honeywell and IBM has provided greater opportunity to test quantum algorithms on quantum computers. Efficient and accurate implementation of quantum algorithms allows the algorithms to be tested and improved upon. Even though hardware availability has increased, implementing quantum algorithms can be challenging because quantum algorithms are often presented in scientific journals and are intended to be analyzed from a theoretical perspective. That is, a text-based quantum algorithm typically will not contain explicit programming instructions explaining how to implement the algorithm on a quantum computing system. As a result, only those who have completed years of education and training in quantum mechanics, quantum computing, and computer science can efficiently and accurately implement text-based quantum algorithms on quantum hardware. Furthermore, even when a text-based quantum algorithm provides explicit programming instructions, the text-based presentation is often lengthy and complex and, as such, implementing the algorithm can be an inefficient process.

Quantum algorithms can also be represented by graphical models called quantum circuits. Quantum circuits present the steps in a quantum algorithm using a series of symbols. Quantum circuits can be implicit—that is, they can represent subroutines intended to cause the quantum computing system to evolve from one state to a subsequent state as abstract "black boxes." Implicit quantum circuits do not provide any inherent benefits over text-based quantum algorithms because they do not necessarily contain any more information than text-based quantum algorithms. However, explicit quantum circuits, which contain all of the programming instructions necessary to implement the quantum algorithm on a quantum computing system, have several advantages. Namely, because quantum circuits represent quantum algorithms symbolically in a diagram rather than in writing using mathematical formalisms, explicit quantum circuits are typically able to present necessary information compactly and concisely. In addition, unlike with text-based algorithms, programmers need not have expertise in quantum mechanics to be taught how to read and understand quantum circuits.

Since a large number of quantum algorithms are provided in writing, transforming text-based, potentially non-explicit quantum algorithms into explicit quantum circuits would increase the speed and accuracy with which quantum algorithms can be implemented. However, manually transforming a text-based quantum algorithm into an explicit quantum circuit is a complex and time-consuming task that requires expertise in quantum mechanics, quantum computing, and programming. As such, solutions are needed which efficiently generate explicit quantum circuits based on text-based quantum algorithms in order to reduce the level of expertise required to implement quantum algorithms on quantum computing systems.

SUMMARY

Disclosed herein are methods for generating quantum circuits from text-based quantum algorithms. In one or more examples, the methods may involve identifying patterns which characterize transitions between quantum states. In one or more examples, users may only be required to provide text-based representations of the quantum states required by a quantum algorithm. In one or more examples, the methods can automatically generate quantum circuits representing the quantum states and the transitions between them. In one or more examples, providing quantum circuit representations of quantum algorithms can lower the level of expertise needed to implement quantum algorithms on quantum hardware.

In one or more examples, a method for generating a quantum circuit from a text-based quantum algorithm comprises: receiving a text-based quantum algorithm to be performed by a quantum computing system, wherein the text-based quantum algorithm comprises a first state vector characterizing a first quantum state of one or more qubits and a second state vector characterizing a second quantum state of the one or more qubits; generating a first syntax tree based on the first state vector, wherein the first syntax tree comprises one or more nodes representing one or more elements of the first state vector of the text-based quantum algorithm; generating a second syntax tree based on the second state vector, wherein the second syntax tree comprises one or more nodes representing one or more elements of the second state vector of the text-based quantum algorithm; generating transition information based on the first syntax tree and the second syntax tree, wherein the transition information characterizes a transition from the first quantum state to the second quantum state of the one or more qubits; selecting, based on the generated transition information, a type of transition that characterizes the transition from the first quantum state to the second quantum state; and generating a quantum circuit based on the first and second state vectors, the generated first and second syntax trees, the generated transition information, and the selected type of transition, wherein the quantum circuit indicates the first quantum state characterized by the first state vector, the selected type of transition, and the second quantum state characterized by the second state vector.

In one or more examples, the method further comprises standardizing the first state vector prior to generating the first syntax tree.

In one or more examples, the method further comprises standardizing the second state vector prior to generating the second syntax tree.

In one or more examples, generating the first syntax tree comprises parsing the first state vector and identifying one or more elements appearing in the first state vector.

In one or more examples, generating the second syntax tree comprises parsing the second state vector and identifying one or more elements appearing in the second state vector.

In one or more examples, generating the transition information comprises generating one or more of: a first metadata set associated with the first abstract syntax tree and a second metadata set associated with a second abstract syntax tree.

In one or more examples, generating the transition information comprises: identifying one or more differences between the first syntax tree and the second syntax tree; and determining a pattern based on the first state vector, the second state vector, and the identified one or more differences.

In one or more examples, the one or more elements of the first state vector comprise kets, amplitudes, values, entanglement groups, phase information, or mathematical operations associated with the first state vector.

In one or more examples, the one or more elements of the second state vector comprise kets, amplitudes, values, entanglement groups, phase information, or mathematical operations associated with the first state vector.

In one or more examples, determining the type of transition comprises: comparing the generated transition information to one or more patterns characterizing one or more known types of transitions; and selecting a pattern of the one or more patterns that matches the generated transition information.

In one or more examples, determining the type of transition comprises applying one or more mathematical representations of one or more quantum operators to the first state vector.

In one or more examples, a system for generating a quantum circuit from a text-based quantum algorithm comprising a memory and one or more processors is provided, wherein the memory stores one or more programs that, when executed by the one or more processors, cause the one or more processors to: receive a text-based quantum algorithm to be performed by a quantum computing system, wherein the text-based quantum algorithm comprises a first state vector characterizing a first quantum state of one or more qubits and a second state vector characterizing a second quantum state of the one or more qubits; generate a first syntax tree based on the first state vector, wherein the first syntax tree comprises one or more nodes representing one or more elements of the first state vector of the text-based quantum algorithm; generate a second syntax tree based on the second state vector, wherein the second syntax tree comprises one or more nodes representing one or more elements of the second state vector of the text-based quantum algorithm; generate transition information based on the first syntax tree and the second syntax tree, wherein the transition information characterizes a transition from the first quantum state to the second quantum state of the one or more qubits; select, based on the generated transition information, a type of transition that characterizes the transition from the first quantum state to the second quantum state; and generate a quantum circuit based on the first and second state vectors, the generated first and second syntax trees, the generated transition information, and the selected type of transition, wherein the quantum circuit indicates the first quantum state characterized by the first state vector, the selected type of transition, and the second quantum state characterized by the second state vector.

In one or more examples of the system, the first state vector is standardized prior to the generation of the first syntax tree.

In one or more examples of the system, the second state vector is standardized prior to the generation of the second syntax tree.

In one or more examples of the system, generating the first syntax tree comprises parsing the first state vector and identifying one or more elements appearing in the first state vector.

In one or more examples of the system, generating the second syntax tree comprises parsing the second state vector and identifying one or more elements appearing in the second state vector.

In one or more examples of the system, generating the transition information comprises generating one or more of: a first metadata set associated with the first abstract syntax tree and a second metadata set associated with a second abstract syntax tree.

In one or more examples of the system, generating the transition information comprises: identifying one or more differences between the first syntax tree and the second syntax tree; and determining a pattern based on the first state vector, the second state vector, and the identified one or more differences.

In one or more examples of the system, the one or more elements of the first state vector comprise kets, amplitudes, values, entanglement groups, phase information, or mathematical operations associated with the first state vector.

In one or more examples of the system, the one or more elements of the second state vector comprise kets, amplitudes, values, entanglement groups, phase information, or mathematical operations associated with the first state vector.

In one or more examples of the system, determining the type of transition comprises: comparing the generated transition information to one or more patterns characterizing one or more known types of transitions; and selecting a pattern of the one or more patterns that matches the generated transition information.

In one or more examples of the system, determining the type of transition comprises applying one or more mathematical representations of one or more quantum operators to the first state vector.

In one or more examples, a non-transitory computer readable storage medium storing one or more programs for generating a quantum circuit from a text-based quantum algorithm is provided wherein the programs, when executed by one or more processors of an electronic device, cause the device to: receive a text-based quantum algorithm to be performed by a quantum computing system, wherein the text-based quantum algorithm comprises a first state vector characterizing a first quantum state of one or more qubits and a second state vector characterizing a second quantum state of the one or more qubits; generate a first syntax tree based on the first state vector, wherein the first syntax tree comprises one or more nodes representing one or more elements of the first state vector of the text-based quantum algorithm; generate a second syntax tree based on the second state vector, wherein the second syntax tree comprises one or more nodes representing one or more elements of the second state vector of the text-based quantum algorithm; generate transition information based on the first syntax tree and the second syntax tree, wherein the transition information characterizes a transition from the first quantum state to the second quantum state of the one or more qubits; select, based on the generated transition information, a type of transition that characterizes the transition from the first quantum state to the second quantum state; and generate a quantum circuit based on the first and second state vectors, the generated first and second syntax trees, the generated transition information, and the selected type of transition, wherein the quantum circuit indicates the first quantum state characterized by the first state vector, the selected type of transition, and the second quantum state characterized by the second state vector.

In one or more examples of the non-transitory computer readable storage medium, the first state vector is standardized prior to the generation of the first syntax tree.

In one or more examples of the non-transitory computer readable storage medium, the second state vector is standardized prior to the generation of the second syntax tree.

In one or more examples of the non-transitory computer readable storage medium, generating the first syntax tree comprises parsing the first state vector and identifying one or more elements appearing in the first state vector.

In one or more examples of the non-transitory computer readable storage medium, generating the second syntax tree comprises parsing the second state vector and identifying one or more elements appearing in the second state vector.

In one or more examples of the non-transitory computer readable storage medium, generating the transition information comprises generating one or more of: a first metadata set associated with the first abstract syntax tree and a second metadata set associated with a second abstract syntax tree.

In one or more examples of the non-transitory computer readable storage medium, generating the transition information comprises: identifying one or more differences between the first syntax tree and the second syntax tree; and determining a pattern based on the first state vector, the second state vector, and the identified one or more differences.

In one or more examples of the non-transitory computer readable storage medium, the one or more elements of the first state vector comprise kets, amplitudes, values, entanglement groups, phase information, or mathematical operations associated with the first state vector.

In one or more examples of the non-transitory computer readable storage medium, the one or more elements of the second state vector comprise kets, amplitudes, values, entanglement groups, or mathematical operations associated with the first state vector.

In one or more examples of the non-transitory computer readable storage medium, determining the type of transition comprises: comparing the generated transition information to one or more patterns characterizing one or more known types of transitions; and selecting a pattern of the one or more patterns that matches the generated transition information.

In one or more examples of the non-transitory computer readable storage medium, determining the type of transition comprises applying one or more mathematical representations of one or more quantum operators to the first state vector.

BRIEF DESCRIPTION OF THE FIGURES

The invention will now be described, by way of example only, with reference to the accompanying drawings, in which:

FIG. 3 illustrates an exemplary method for generating syntax trees from text-based state vectors according to one or more examples of the disclosure.

FIG. 4 illustrates an exemplary method for standardizing a text-based state vector according to one or more examples of the disclosure.

FIG. 6 illustrates an exemplary method for identifying a transition between two states according to one or more examples of the disclosure.

DETAILED DESCRIPTION

Figure 1:
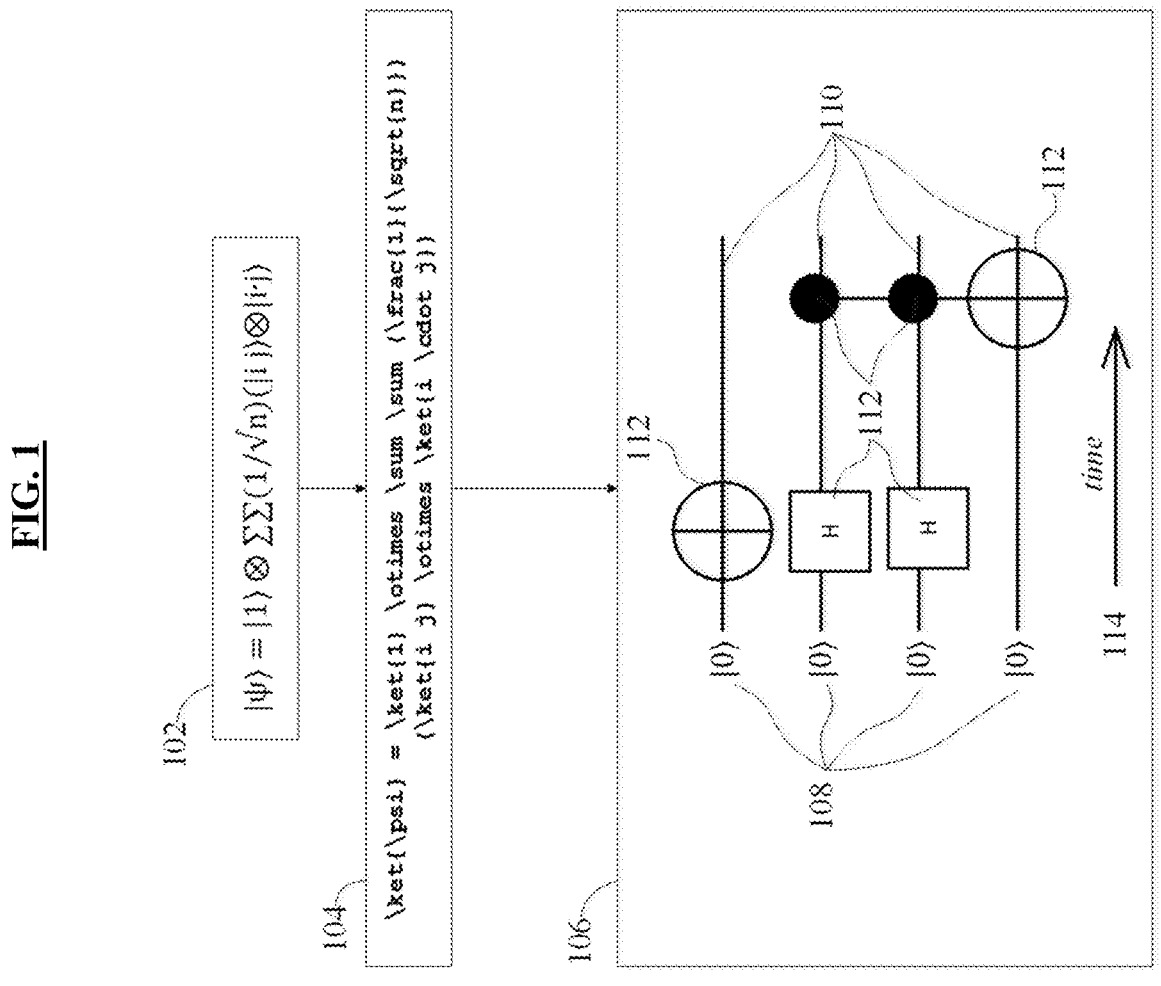
FIG. 1 illustrates an exemplary state vector and a corresponding quantum circuit according to one or more examples of the disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

The present disclosure is directed to methods for generating an explicit quantum circuit from a text-based quantum algorithm. A quantum algorithm is a series of steps performed by a quantum computer to solve a problem. Quantum computers solve problems by performing operations on systems called registers which comprise one or more qubits. A complete (i.e., explicit) quantum algorithm will describe a series of quantum states that one or more registers should transition between as the algorithm progresses as well as the operations that must be performed in order to cause the transitions between states to occur.

As used herein, "text-based quantum algorithm" refers to a quantum algorithm that is described in writing (e.g., in a scientific journal). A text-based quantum algorithm typically details one or more quantum states that a quantum computer would occupy while executing the algorithm. The quantum state of a system provides a probability distribution of all possible measurements on the system. States are represented mathematically by state vectors; conventionally, state vectors are written using Dirac's bra-ket notation as "kets", i.e., they are denoted between a vertical bar ($|$) and a right angle bracket ($\rangle$).

While text-based quantum algorithms are interesting from a theoretical standpoint, they often do not contain all of the information necessary to build software that can be executed by a quantum computer (i.e., text-based algorithms are often incomplete). In order to implement a quantum algorithm on a quantum computer, software developers need to know precisely how the quantum computer achieves each quantum state. One useful tool for providing such information to software developers is the quantum circuit. Quantum circuits are models for quantum computation. An explicit quantum circuit for a given algorithm describes a complete sequence of actions that the quantum computer must perform at each step in the algorithm. Since explicit quantum circuits are typically provided as graphical circuit diagrams, they are compact and efficient tools for providing quantum algorithm information to software developers.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

As discussed above, the techniques disclosed herein transform text-based quantum algorithms into complete quantum circuits. A complete quantum circuit may explicitly provide all necessary operations for implementing the quantum algorithm on a quantum computer. In one or more examples, a user may input a text-based quantum algorithm by providing a series of state vectors which describe a series of quantum states that the quantum computing system must occupy in order to execute the algorithm. The methods of the present disclosure may generate complete (i.e., explicit) quantum circuits for each pair of input state vectors which may provide explicit instructions for causing the quantum computer to transition between the two quantum states described by each pair of state vectors.

FIG. 1 illustrates an exemplary state vector and a corresponding quantum circuit according to one or more examples of the disclosure. Specifically, FIG. 1 illustrates an exemplary state vector 102 and an exemplary quantum circuit 106. As discussed above, state vectors are mathematical representations of quantum states. In one or more examples, state vectors such as state vector 102 may contain all of the information necessary to completely characterize the quantum state they represent.

In one or more examples, a state vector such as state vector 102 may constitute a portion of a text-based quantum algorithm. State vectors in quantum algorithms that are provided in a text-based format (e.g., a scientific journal) are often input in a text editor using a markup language (e.g., LaTeX) configured to represent explicit mathematical symbols as text. Text-based state vector 104 is an exemplary representation of state vector 102 using LaTeX. Note that state vector 102 and text-based state vector 104 are merely different methods of writing the same information; the only distinction is that state vector 102 is intended to be read by a human, while text-based state vector 104 is intended to be processed by a text editor on a computer. Herein, the term "state vector" may be used to refer to a state vector written using explicit mathematical symbols or to a text-based state vector.

Even though state vectors such as state vector 102 (or, equivalently, text-based state vector 104) may contain all information necessary to completely characterize the quantum state they describe, they may lack explicit operations and/or instructions for causing a quantum computer to transition to said quantum states. State vector 102 (/text-based state vector 104), for instance, contains no indication of the registers in a quantum computing system which must be operated on in order for the quantum computing system to transition to the quantum state represented by state vector 102 (/text-based state vector 104).

Quantum circuit 106 is a quantum circuit representation of the information contained in state vector 102 (/text-based state vector 104). In one or more examples, quantum circuits such as quantum circuit 106 may provide an explicit computation sequence to be performed on the quantum computer. In exemplary quantum circuit 106, horizontal lines 110 represent registers in a quantum computing system. Kets 108 on the left side of quantum circuit 106 represent initial states of the registers; symbols such as symbols 112 disposed along horizontal lines 110 indicate operations to be performed on the registers. When reading quantum circuits such as quantum circuit 106, time should be interpreted as flowing from left to right, as indicated by arrow 114; operations such as those indicated by symbols 110 are intended to be performed in time order. Explicit (i.e., complete) quantum circuits such as quantum circuit 106 increase the efficiency with which quantum algorithms can be implemented on quantum computing systems, since any programmer who is trained to read quantum circuits such as quantum circuit 106 would immediately see which operations need to be performed on which qubits as well as the order in which said operations should be executed.

A text-based quantum algorithm will typically include two or more quantum states, each of which may be represented in text by state vectors such as text-based state vector 104. The complete quantum circuit representing an entire quantum algorithm will contain representations of each quantum state as well as the necessary sequence of operations to transition from one state to another. Generating such explicit circuits by hand can be difficult and time consuming, and typically requires expertise in quantum mechanics. The present disclosure is directed to methods for automatically generating explicit quantum circuits, such as quantum circuit 106, from text-based, mathematical representations of quantum states, such as text-based state vector 104. Such methods will allow for quantum algorithms to be efficiently implemented on quantum computers without needing to rely on personnel who have experience in quantum physics.

Figure 2:
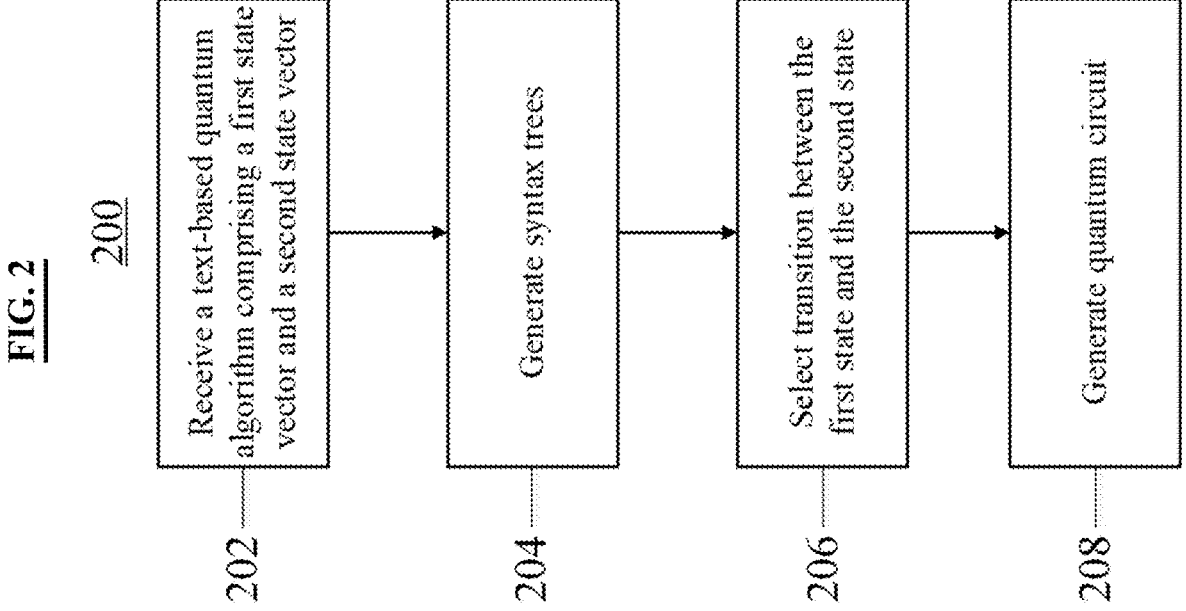
FIG. 2 illustrates an exemplary method for generating a quantum circuit from a text-based quantum algorithm according to one or more examples of the disclosure.

FIG. 2 illustrates an exemplary method for generating a quantum circuit from a text-based quantum algorithm according to one or more examples of the disclosure. Specifically, FIG. 2 illustrates an exemplary method 200 for generating quantum circuits from text-based quantum algorithms. In one or more examples, method 200 can be executed by a computer. In one or more examples, a user may install software comprising instructions for executing method 200 onto a personal computer. In one or more examples, method 200 may be executed by a remote computer configured to receive necessary inputs from a user's personal computer.

In one or more examples, method 200 may begin with step 202, wherein the computer may receive a text-based quantum algorithm comprising text-based representations a first state vector and a second state vector. In one or more examples, the first state vector may represent the quantum state of one or more qubits in a quantum computing system at a first point in time and the second state vector may represent the quantum state of the one or more qubits in the quantum computing system at a subsequent second point in time. In one or more examples, a user may provide the text-based quantum algorithm to the computer via a user interface. In one or more examples, the first state vector and the second state vector may be written in a markup language (e.g., LaTeX—see, for example, text-based state vector 104 shown in FIG. 1).

After receiving the text-based quantum algorithm in step 202, method 200 may proceed to step 204, wherein syntax trees corresponding to the first text-based state vector and the second text-based state vector may be generated. The syntax trees may be representations of the structures of the state vectors. In one or more examples, a syntax tree associated with the first state vector may comprise nodes representing one or more elements constituting the first state vector. Similarly, in one or more examples, a syntax tree associated with the second state vector may comprise nodes representing one or more elements constituting the second state vector. Optionally, elements constituting each state vector may include kets (see, for example, state vector 102 shown in FIG. 1, which comprises a combination of kets), mathematical operations (e.g., summations, products, etc.), scaling factors (e.g., amplitudes), phase information, and/or variables.

Following the generation of the syntax trees in step 204, method 200 may move to step 206, wherein a transition between the first quantum state and the second quantum state may be selected. Selecting a transition may comprise selecting one or more quantum operations that may be performed on one or more qubits of the quantum computing system. In one or more examples, selecting a transition may comprise generating transition information. Transition information may indicate quantum operations that must be done on the first quantum state in order for the quantum computer to transform from the first state to the second state. Transition information may, in one or more examples, be extracted based on identified patterns in the first and second state vectors as well as their corresponding syntax trees. In one or more examples, the identified patterns may be compared to one or more known patterns in order to determine whether any known pattern are a close match to the identified pattern. In one or more examples, the computer may be configured to directly apply one or more mathematical representations of quantum operators to the state vectors in order to determine one or more operation that can transform the first state vector into the second state vector.

After a transition has been selected in step 206, method 200 may proceed to step 208, wherein a quantum circuit representing the first quantum state, the second quantum state, and the transition between the first and second state may be generated. The quantum circuit may indicate operations that may be performed on one or more qubits in the quantum computing system in order for the transition to occur. In one or more examples, the quantum circuit may be created based on the first and second state vectors, the syntax trees, and/or the identified transition information. In one or more examples, the quantum circuit may be output to a user as an image (e.g., a PNG file) or as a PDF so that it may be easily transferred to software developers.

As shown, method 200 generates a complete quantum circuit that explicitly shows the quantum computational operations that must occur in order to transition between two quantum states. In one or more examples, a quantum algorithm may, of course, require the quantum computer to transition between more than two quantum states; as such, a text-based algorithm may include a series of state vectors. In one or more examples, method 200 may be applied to subsequent pairs of state vectors in a series order to generate quantum circuits representing each step in an algorithm. In one or more examples, these quantum circuits may then be combined to create a master quantum circuit that represents the entire algorithm.

In many cases, there may be significant variation in style between text-based quantum algorithms originating from different fields. A quantum algorithm developed by a physicist, for instance, may be expressed in text in a different manner than a quantum algorithm created by a computer scientist. In order to generate quantum circuits consistently and efficiently, the text-based quantum algorithms may be processed after they are received by the computer. In one or more examples, these processed algorithms may be used to generate syntax trees, which in turn may be used to create the quantum circuits.

FIG. 3 illustrates an exemplary method for generating syntax trees from text-based state vectors according to one or more examples of the disclosure. Specifically, FIG. 3 illustrates an exemplary method 300 for processing text-based quantum algorithms and generating syntax trees. In one or more examples, one or more steps of method 300 may be executed by a computer. In one or more examples, steps 202 and 204 of method 200 shown in FIG. 2 may include method 300.

In one or more examples, method 300 may begin at step 302, wherein a text-based quantum algorithm comprising text-based representations of first state vector and a second state vector may be received. For further discussion of this step, see the description above of step 202 of FIG. 2.

After receiving the text-based quantum algorithm in step 302, method 300 may proceed to step 304*a* or to step 304*b*. In step 304*a*, the first state vector may be standardized to form a standardized first state vector. Likewise, in step 304*b*, the second state vector may be standardized to form a standardized second state vector. In one or more examples, steps 304*a* and 304*b* may be performed simultaneously. In one or more examples, the standardization process may ensure that the state vectors obey a predetermined set of rules, regardless of the stylistic preferences of those who developed the quantum algorithm. Additionally, in one or more examples, standardization may expedite ensuing method steps (e.g., the generating syntax trees) by identifying and consolidating various elements to the state vectors in advance.

FIG. 4 illustrates an exemplary method for standardizing a state vector according to one or more examples of the disclosure. Specifically, FIG. 4 shows an exemplary input standardization method 400 comprising steps which may be taken to transform a state vector from its input form to a standard form. In one or more examples, method 400 may be executed using a computer algebra system (CAS) and may be configured to mathematically transform a raw markup string (e.g., a raw LaTeX string) providing a state vector (i.e., the state vector as input by the user) into a standardized format. In one or more examples, steps 304*a* and 304*b* may comprise performing one or more steps of method 400. Method 400 is meant as an example only and should not be construed as limiting to the examples of the disclosure. Additionally, the steps presented in method 400 can be performed in any order, and thus the sequence of steps presented in FIG. 4 should not be seen as limiting to the disclosure. In one or more examples a standardization method can include steps not presented in method 400.

In one or more examples, method 400 may comprise a step 402, wherein a state vector may be transformed to be of the form $|$Variable Name$\rangle = |$Value$\rangle$. In one or more examples, step 402 may comprise performing one or more calculations in order to transform a state vector to the appropriate form.

In one or more examples, method 400 may comprise a step 404, which may comprise ensuring that all finite summations over a single summation index i specify an initial value $v_i$ and a final value $v_f$.

In one or more examples, method 400 may comprise a step 406 wherein all "conditional summations"—that is, summations which do not have discrete upper and lower indices but rather state a condition which must be satisfied by the variables being summed—may be compiled and simplified. A state vector may include terms xi which are summed whenever i meets a certain condition. For instance, the terms xi may be summed for all i contained in a set S, for all i where a<i<b for some values a and b, or for all i where i≠j for some value(s) j. Step 406 may ensure that all terms summed only where a specific condition is valid are captured by a summation symbol which clearly indicates the condition.

The quantum state described by the state vector may be a superposition (sum) of multiple component vectors describing the possible measurement outcomes of the quantum computing system with their associated amplitude and phase. In one or more examples, method 400 may comprise a step 408, which may involve transforming the state vector such that the summand of each summation includes only a single ket written to the right of the summation symbol. This ket may represent the values of all registers in the quantum computing system for a particular element in a superposition. The ket may, in one or more examples, include an amplitude and/or a phase which does not depend on the summation index. Thus, in one or more examples, step 408 may further comprise transforming each summation such that any amplitude and/or phase which does not depend on the summation index is removed from the summand and instead written to the left of the summation symbol.

As discussed above, an input standardization method can include steps not presented in method 400. Specifically, an input standardization method may comprise any steps taken to increase the predictability of the format of the text-based state vectors input by the user. In one or more examples, method 400 may comprise transformations in addition to those given in steps 402-408. In one or more examples, an input standardization method may include any mathematical or quantum operation or transformation intended to simplify or homogenize state vectors. In one or more examples, an input standardization method may comprise inserting explicit mathematical symbols such as grouping symbols (e.g., parentheses) or arithmetic symbols (e.g., inserting a dot between two variables to indicate that a product of said variables) to increase the computer-readability of a state vector.

FIG. 3 shows that, in one or more examples, following the standardization of the first state vector in step 304*a*, method 300 may proceed to step 306*a*, wherein the standardized first state vector may be parsed to identify one or more elements constituting the first state vector. Similarly, following the standardization of the second state vector in step 304*b*, method 300 may, in one or more examples, proceed to step 306*b*, wherein the standardized second state vector may be parsed to identify one or more elements constituting the second state vector. In one or more examples, steps 306*a* and 306*b* may be performed simultaneously. In one or more examples, elements constituting the state vectors may include constituent state vectors (e.g., one or more kets which make up the state vector), mathematical operations (e.g., summations, products, etc.), scaling factors (e.g., amplitudes), and/or variables.

After parsing the first state vector in step 306*a*, method 300 may proceed to step 308*a*, wherein a first syntax tree may be generated based on one or more constituent elements of the first state vector that were identified in step 306*a*. Similarly, after parsing the second state vector in step 306*b*, method 300 may proceed to step 308*b*, wherein a second syntax tree may be generated based on one or more constituent elements of the second state vector that were identified in step 306*b*. In one or more examples, steps 308*a* and 308*b* may be performed simultaneously.

Figure 5:
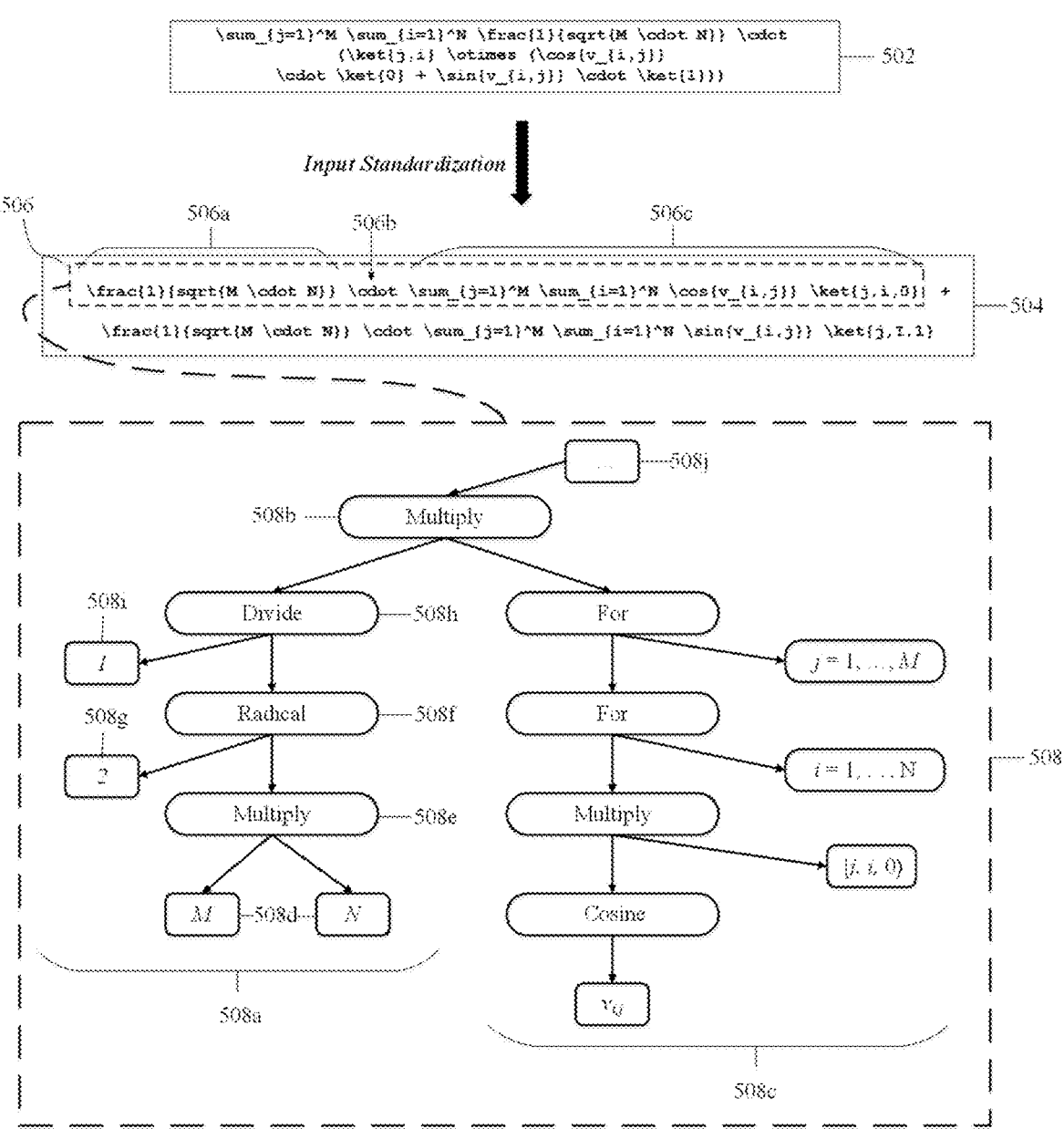
FIG. 5 illustrates an exemplary text-based state vector and a corresponding syntax tree according to one or more examples of the disclosure.

FIG. 5 illustrates an exemplary state vector and a corresponding syntax tree according to one or more examples of the disclosure. Specifically, FIG. 5 illustrates an exemplary text-based state vector 502 (written here using LaTeX), a standardized text-based state vector 504 (also written using LaTeX) corresponding to state vector 502, and an exemplary syntax tree 508 representing a term 506 of the standardized state vector 504. In one or more examples, a text-based state vector such as state vector 502 may be input by a user as a portion of a text-based quantum algorithm. The input text-based state vector may undergo an input standardization process (e.g., input standardization process 400 described in FIG. 4) to generate a standardized text-based state vector such as standardized state vector 504. One or more elements of the standardized text-based state vector may be extracted and a syntax tree such as syntax tree 508 may be generated based on the identified elements.

In one or more examples, a branch of a syntax tree such as syntax tree 508 may represent an element (or set of elements) constituting a state vector and a node of a syntax tree may represent an operation performed on one or more elements (or one or more sets of elements). As shown, syntax tree 508 comprises a branch 508a which may represent elements 506a of term 506 in standardized state vector 504. Similarly, branch 508c may represent elements 506c of term 506 in standardized state vector 504. As shown, elements 506a and elements 506c are combined via operation 506b to form term 506 of standardized state vector 504. Operation 506b may be represented in syntax tree 508 by a node 508b.

In one or more examples, a branch of a syntax tree may comprise one or more sub-branches. In one or more examples, these sub-branches may represent operations performed within a set of elements represented by a branch. For example, elements 506a of term 506 of standardized state vector 504 comprises an inverse of a square root of a product of a variable M and a variable N. These elements and operations may be represented in sub-branches of branch 508a of syntax tree 508. In one or more examples, nodes 508d may represent variables M and N. In one or more examples, node 508e may indicate that the elements in nodes 508d should be multiplied together. In one or more examples, nodes 508f and 508g may indicate that the square root of the result of the operation at node 508e should be taken. In one or more examples, node 508h may indicate that node 508i should be divided by the result of the operation at node 508f. Similarly, elements 506c of term 506 of standardized state vector 504 comprise a plurality of operations performed between elements 506c. Branch 508c may represent these operations using a plurality of sub-branches.

The portions of syntax tree 508 shown explicitly in FIG. 5 correspond only to term 506 in standardized state vector 504. A full syntax tree representing the entire standardized state vector 504 may comprise additional nodes, branches, and/or sub-branches as indicated by item 508j.

The foregoing discussion illustrates the ways in which a syntax tree may provide a high-level overview of the elements and operations that make up a text-based state vector. As a result, syntax trees may allow for efficient extraction of important characteristics of quantum states. In one or more examples, these characteristics may be used to identify how a quantum computer may transition from one quantum state into a subsequent quantum state while executing a quantum algorithm.

As mentioned above, in one or more examples, text-based quantum algorithms may represent the first quantum state of one or more registers in a quantum computing system with a first text-based state vector and the second quantum state of the one or more registers in a quantum computing system with a second text-based state vector. However, such text-based state vectors alone may not provide sufficient information about the quantum computational operations that must be performed on the one or more registers in order to transition the quantum computing system from the first quantum state to the second quantum state. This transition information is necessary in order to implement quantum algorithms on quantum computing hardware.

FIG. 6 illustrates an exemplary method for determining a transition between two states according to one or more examples of the disclosure. In particular, FIG. 6 illustrates an exemplary method 600 for determining a transition between a first quantum state and a second quantum state using syntax tree representations of said quantum states. In one or more examples, one or more steps of method 600 may be executed by a computer. In one or more examples, steps 204 and 206 of method 200 shown in FIG. 2 may include method 600. In one or more examples, one or more steps of method 600 may comprise or follow one or more steps of method 300 shown in FIG. 3.

In one or more examples, method 600 may comprise step 602a, wherein a first syntax tree based on one or more elements identified in a first text-based state vector may be generated. In one or more examples, method 600 may also comprise step 602b, wherein a second syntax tree based on one or more elements identified in the second text-based state vector may be generated. In one or more examples, steps 602a and 602b may be performed simultaneously. For further discussion of the generation of syntax trees from state vectors, see the descriptions of steps 308a and 308b of method 300 shown in FIG. 3 and/or the discussion of FIG. 5.

After generating the first syntax tree in step 602a, method 600 may proceed to step 604a, wherein the first syntax tree may be converted into a first list of superposition terms. In one or more examples, each entry in the first list of superposition terms may include associated amplitudes, summations, and kets. In one or more examples, converting the first syntax tree to the first list of superposition terms may comprise representing one or more entries in the first list using a computational model. In one or more examples, after the entries have been represented by the model, the model may be converted into a markup string (e.g., a LaTeX string). Similarly, after generating the second syntax tree in step 602b, method 600 may proceed to step 604b wherein the second syntax tree may be converted into a second list of superposition terms. In one or more examples, each entry in the second list of superposition terms may include associated amplitudes, summations, and kets. In one or more examples, converting the second syntax tree to the second list of superposition terms may comprise representing one or more entries in the second list using a computational model. In one or more examples, after the entries have been represented by the model, the model may be converted into a markup string (e.g., a LaTeX string). In one or more examples, steps 604a and 604b may increase the efficiency with which information necessary for identifying a transition between the first quantum state and the second quantum state can be extracted.

After converting the first syntax tree into the first list of superposition terms in step 604a, method 600 may proceed to step 606a, wherein a first metadata set based on the first syntax tree, the first list of superposition terms, and the first text-based state vector may be extracted. In one or more examples, the first metadata set may comprise information associated with amplitudes, phases, values and/or entanglement groups associated with the first quantum state. In one or more examples, the first metadata set may include counts of one or more elements appearing in the first state vector. Similarly, after converting the second syntax tree into the second list of superposition terms at step 604b, method 600 may proceed to step 606b, wherein a second metadata set based on the second syntax tree, the second list of superposition terms, and the second state vector may be extracted. In one or more examples, the second metadata set may comprise information associated with amplitudes, phases, values and/or entanglement groups associated with the second quantum state. In one or more examples, the second metadata set may include counts of one or more elements appearing in the second state vector. In one or more examples, steps 606a and 606b may be performed simultaneously.

Following the extraction of the first and second metadata sets in steps 606a-606b, method 600 may proceed to step 608, wherein differences between the first quantum state and the second quantum state may be identified. In one or more examples, differences between the two states may be identified based on the first state vector, the second state vector, the first syntax tree, the second syntax tree, the first list of superposition terms, the second list of superposition terms, the first metadata set, and/or the second metadata set. In one or more examples, differences between the two states may be identified automatically (i.e., algorithmically) by a computer.

After identifying the differences between the first quantum state and the second quantum state in step 608, method 600 may move to a step 610, wherein a transition between the first quantum state and the second quantum state may be characterized. In one or more examples, characterizing the transition may involve identifying one or more patterns associated with the first state vector, the second state vector, the first syntax tree, the second syntax tree, the first list of superposition terms, the second list of superposition terms, the first metadata set, the second metadata set, and/or differences between the first quantum state and the second quantum state. In one or more examples, one or more identified patterns may be compared to a plurality of known patterns in order to determine whether one or more identified patterns match a known pattern. In one or more examples, the plurality of known patterns may be empirically determined. In one or more examples, one or more known patterns may comprise known quantum operators such as Hadamard (H) operators, controlled not (CNOT) operators, SWAP operators, controlled SWAP operators, Pauli-X (X) operators, Pauli-Y (Y) operators, phase (S, P) operators, and/or rotation operators. Known patterns may comprise any known operations; the preceding list of operators is non-exhaustive and should not be construed as limiting the disclosure.

In one or more examples, characterizing a transition in step 610 may require performing one or more calculations. In one or more examples, one or more mathematical representations of one or more quantum operators may be applied to the first state vector. In one or more examples, the results of the applications of the quantum operators on the first state vector may be compared to the second state vector. In one or more examples, characterizing the transition may comprise identifying the one or more quantum operators that produce the second state vector when applied to the first state vector. In one or more examples, after the transition has been characterized, information associated with the transition may be output as a markup string (e.g., a LaTeX string).

Figure 7:
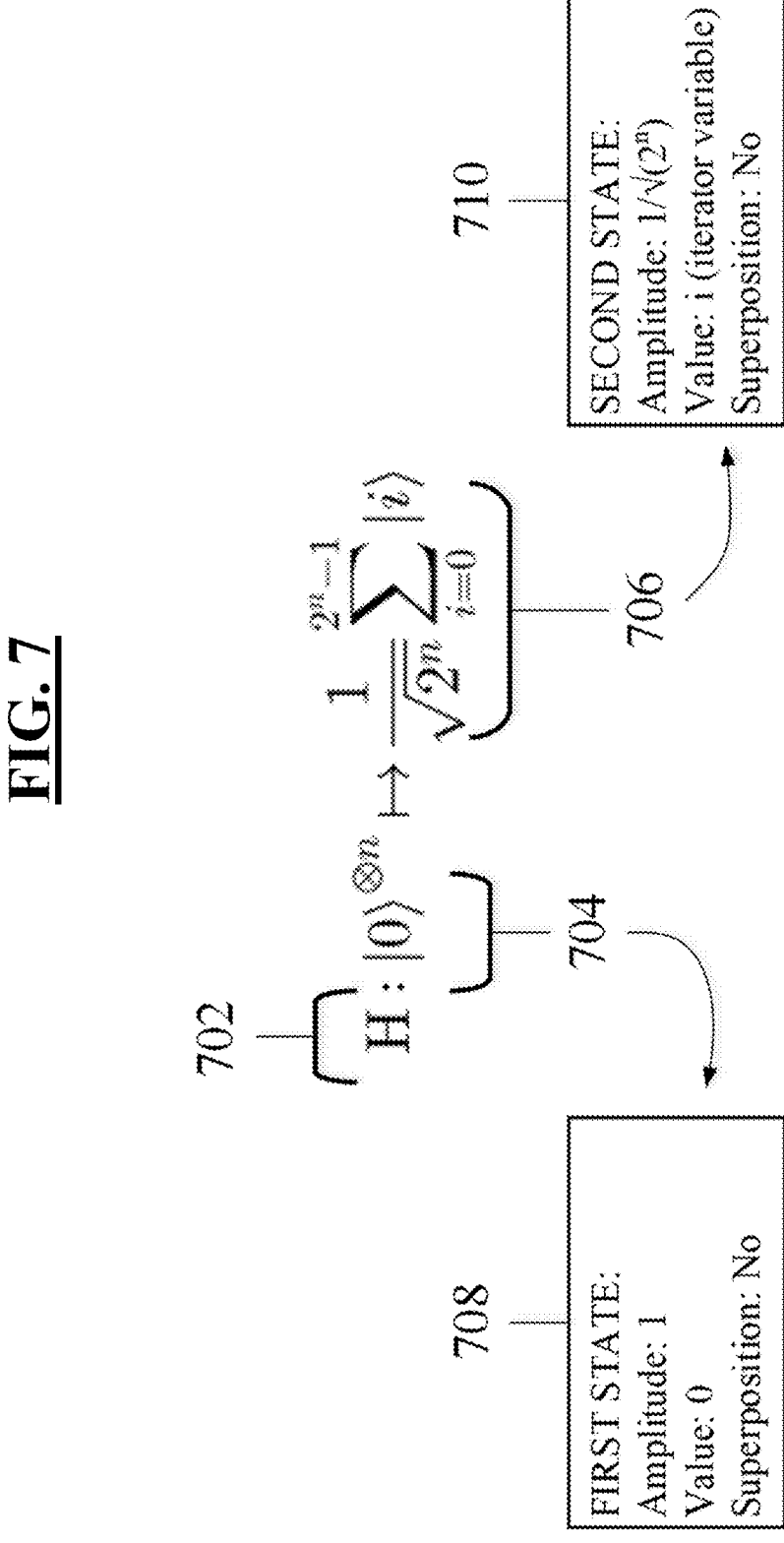
FIG. 7 illustrates an exemplary transition between two states according to one or more examples of the disclosure.

FIG. 7 illustrates an exemplary transition between two states according to one or more examples of the disclosure. Specifically, FIG. 7 illustrates an exemplary transition 702 between a first state vector 704 and a second state vector 706. In this particular example, transition 702 is a Hadamard operation. According to FIG. 7, applying a Hadamard operation to one or more qubits in a quantum computing system in a first quantum state represented by the first state vector 704 will transition the system to a second quantum state represented by the second state vector 706. Transition 702 is meant only as an example and should not interpreted as limiting to this disclosure.

As discussed previously, in one or more examples, transitions such as transition 702 may be identified based on one or more generated metadata sets. FIG. 7 shows a first metadata set 708 based on the first state vector 704 and a second metadata set 710 based on the second state vector 706. The first metadata set 708 comprises amplitude, value, and superposition data associated with the first state vector 704. Similarly, the second metadata set 710 comprises amplitude, value, and superposition data associated with the second state vector 706. In one or more examples, generated metadata sets such as metadata sets 708 and 710 may aid in efficient identification of differences between a first quantum state and a second quantum state, which may, in turn, allow transitions such as transition 702 to be identified. Metadata sets 708 and 710 are presented as an examples only and the information they contain should not be construed as limiting to the disclosure.

In one or more examples, identifying and characterizing a transition between a first quantum state and a second quantum state in a quantum algorithm may provide information about implementations of the quantum algorithm on a quantum computer. In one or more examples, implementation information may comprise information necessary to generate a quantum circuit representing the first state, the second state, and operations that can cause a quantum computing system to transition between the two states.

Figure 8:
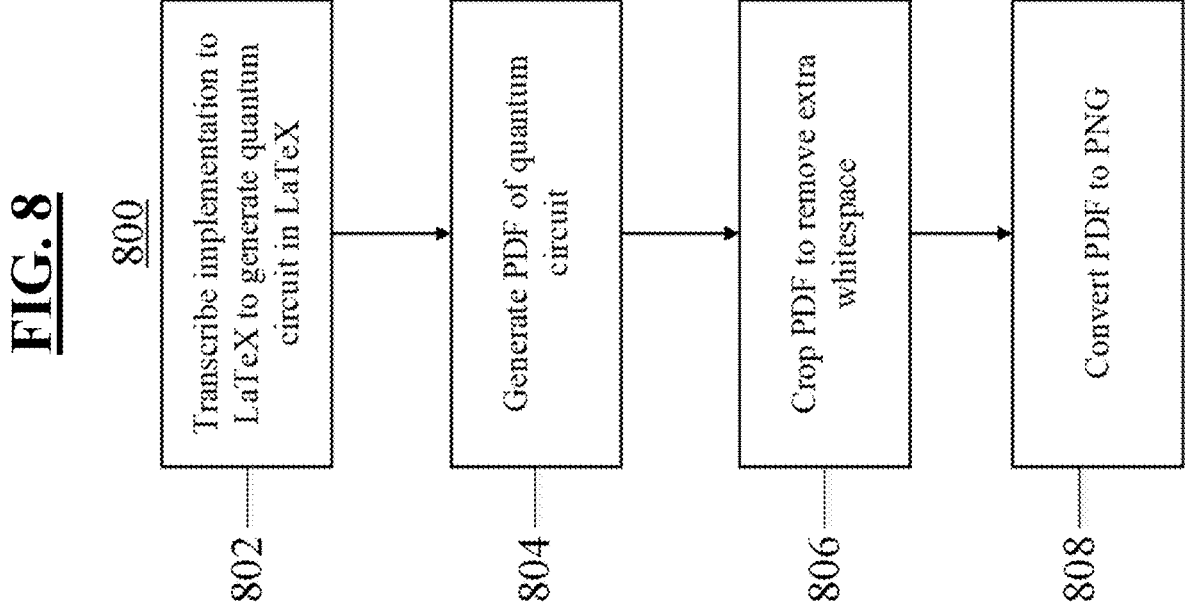
FIG. 8 illustrates an exemplary method for generating a quantum circuit according to one or more examples of the disclosure.

FIG. 8 illustrates an exemplary method for generating a quantum circuit according to one or more examples of the disclosure. In particular, FIG. 8 illustrates an exemplary method 800 for generating a quantum circuit using LaTeX. In one or more examples, one or more steps of method 800 may be executed by a computer. In one or more examples, step 208 of method 200 shown in FIG. 2 may include method 800. In one or more examples, one or more steps of method 800 may comprise or follow one or more steps of method 600 shown in FIG. 6.

In one or more examples, method 800 may begin at step 802, wherein information associated with a quantum computing implementation may be transcribed in LaTeX in order to generate a quantum circuit. In one or more examples, an implementation may be based on a first state vector, a second state vector, a first syntax tree, a second syntax tree, a first metadata set, a second metadata set, and/or an identified transition between the first state vector and the second state vector. In one or more examples, one or more transcriptions of one or more previously generated quantum circuits may be combined to form one master quantum circuit.

After transcribing the implementation information at step 802, method 800 may proceed to step 804, wherein the transcription of the implementation in LaTeX may be compiled to generate a PDF of the quantum circuit. In one or more examples, after generating the PDF, method 800 may move to step 806, wherein the PDF of the quantum circuit may be cropped to remove any whitespace. Finally, after unnecessary whitespace has been removed, method 800 may proceed to step 808, wherein the PDF of the quantum circuit may be converted to a PNG. In one or more examples, the PNG of the quantum circuit may be transmitted or displayed to a user.

Figure 9:
FIG. 9 illustrates an exemplary user interface for inputting a text-based quantum algorithm according to one or more examples of the disclosure.

In one or more examples, a user may provide a text-based quantum algorithm to a computer configured to execute a method for generating a quantum circuit from a text-based quantum algorithm. In one or more examples, the user may provide the text-based algorithm via a user interface. FIG. 9 illustrates an exemplary user interface 900 for inputting a text-based quantum algorithm according to one or more examples of the disclosure. In one or more examples, user interface 900 may be configured to display on a user's personal computing device.

In one or more examples, user interface 900 may be configured to allow users to provide information associated with a text-based quantum algorithm. In one or more examples, user interface 900 may be configured to receive an algorithm name 902 and an algorithm description 904. In one or more examples, user interface 900 may allow users to add or delete one or more registers in a register entry field 906. In one or more examples, a register may comprise one or more elements of a state vector representing a quantum state. In one or more examples, user interface 900 may be comprise a state vector display 908 configured to display a state vector based on the one or more registers added by the user.

In one or more examples, user interface 900 may comprise an icon 912 configured to allow users to add one or more algorithm steps. In one or more examples, selecting icon 912 may cause one or more fields 910 to be displayed. In one or more examples, fields 910 may be configured to receive information associated with a step of a quantum algorithm such as a step number, a step name, a step description, and a LaTeX transcription state vector representing the quantum state occupied by a quantum computing system during a step.

In one or more examples, user interface 900 may display information associated with a parsed state vector in a field 914. In one or more examples, field 914 may comprise registers, entanglement information, superposition information, and/or term information associated with a state vector. In one or more examples, parsed state vector information displayed in field 914 may be generated based on user inputs in fields 902-912.

In one or more examples, user interface 900 may display implementation information in a field 916. In one or more examples, implementation information may comprise an identified transition between two quantum states. In one or more examples, implementation information displayed in field 916 may be generated based on user inputs in fields 902-912.

In one or more examples, user interface 900 may display one or more quantum circuits in a field 918. In one or more examples, field 918 may comprise quantum circuits representing one or more steps in a quantum algorithm. In one or more examples, implementation information displayed in field 918 may be generated based on user inputs in fields 902-912.

Figure 10:
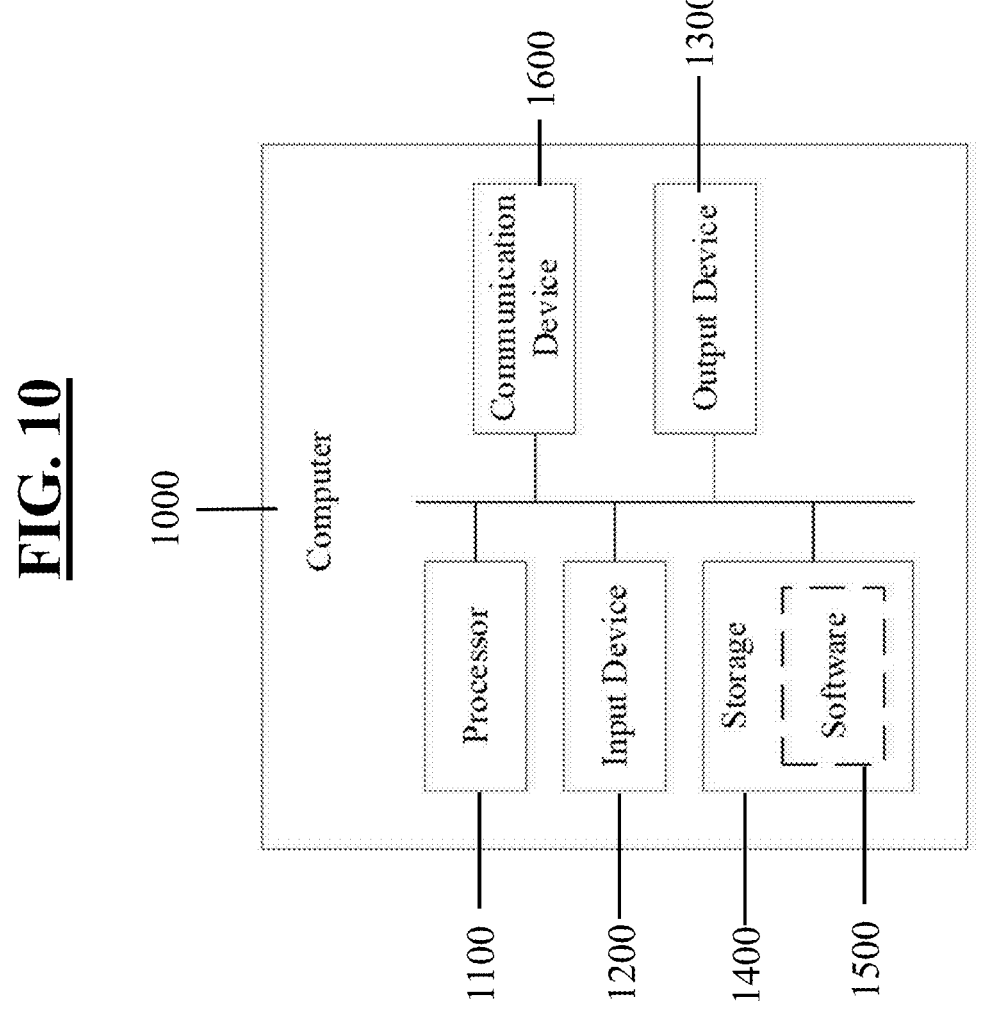
FIG. 10 illustrates an exemplary computing system, according to examples of the disclosure.

FIG. 10 illustrates an exemplary computing system, according to examples of the disclosure. In one or more examples, computer 1000 may be involved in executing one or more of the methods described herein, such as method 200 shown in FIG. 2. Computer 1000 can be a host computer connected to a network. Computer 1000 can be a client computer or a server. As shown in FIG. 8, computer 1000 can be any suitable type of microprocessor-based device, such as a personal computer, workstation, server, or hand-held computing device, such as a phone or tablet. The computer can include, for example, one or more of processor 1100, input device 1200, output device 1300, storage 1400, and communication device 1600. Input device 1200 and output device 1300 can correspond to those described above and can either be connectable or integrated with the computer.

Input device 1200 can be any suitable device that provides input, such as a touch screen or monitor, keyboard, mouse, or voice-recognition device. Output device 1300 can be any suitable device that provides an output, such as a touch screen, monitor, printer, disk drive, or speaker.

Storage 1400 can be any suitable device that provides storage, such as an electrical, magnetic, or optical memory, including a random access memory (RAM), cache, hard drive, CD-ROM drive, tape drive, or removable storage disk. Communication device 1600 can include any suitable device capable of transmitting and receiving signals over a network, such as a network interface chip or card. The components of the computer can be connected in any suitable manner, such as via a physical bus or wirelessly. Storage 1400 can be a non-transitory computer-readable storage medium comprising one or more programs, which, when executed by one or more processors, such as processor 1100, cause the one or more processors to execute methods described herein.

Software 1500, which can be stored in storage 1400 and executed by processor 1100, can include, for example, the programming that embodies the functionality of the present disclosure (e.g., as embodied in the systems, computers, servers, and/or devices as described above). In one or more examples, software 1500 can include a combination of servers such as application servers and database servers.

Software 1500 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 1400, that can contain or store programming for use by or in connection with an instruction execution system, apparatus, or device.

Software 1500 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 1000 can implement any operating system suitable for operating on the network. Software 1500 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments and/or examples. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A method for generating a complete quantum circuit from a text-based quantum algorithm, the method comprising:

receiving a text-based quantum algorithm to be performed by a quantum computing system, wherein the text-based quantum algorithm comprises a first state vector characterizing a first quantum state of one or more qubits and a second state vector characterizing a second quantum state of the one or more qubits;

generating a first syntax tree based on the first state vector, wherein the first syntax tree comprises one or more nodes representing one or more elements of the first state vector of the text-based quantum algorithm;

generating a second syntax tree based on the second state vector, wherein the second syntax tree comprises one or more nodes representing one or more elements of the second state vector of the text-based quantum algorithm;

generating transition information based on the first syntax tree and the second syntax tree, wherein the transition information characterizes a transition from the first quantum state to the second quantum state of the one or more qubits;

selecting, based on the generated transition information, a type of transition that characterizes the transition from the first quantum state to the second quantum state; and generating a complete quantum circuit based on the first and second state vectors, the generated first and second syntax trees, the generated transition information, and the selected type of transition, wherein the quantum circuit indicates the first quantum state characterized by the first state vector, the selected type of transition, and the second quantum state characterized by the second state vector.

2. The method of claim 1, further comprising standardizing the first state vector prior to generating the first syntax tree.

3. The method of claim 1, further comprising standardizing the second state vector prior to generating the second syntax tree.

4. The method of claim 1, wherein generating the first syntax tree comprises parsing the first state vector and identifying one or more elements appearing in the first state vector.

5. The method of claim 1, wherein generating the second syntax tree comprises parsing the second state vector and identifying one or more elements appearing in the second state vector.

6. The method of claim 1, wherein generating the transition information comprises generating one or more of: a first metadata set associated with the first abstract syntax tree and a second metadata set associated with a second abstract syntax tree.

7. The method of claim 1, wherein generating the transition information comprises one or more of: converting the first abstract syntax tree into a first list of superposition terms and converting the second syntax tree into a second list of superposition terms.

8. The method of claim 1, wherein generating the transition information comprises:

identifying one or more differences between the first syntax tree and the second syntax tree; and determining a pattern based on the first state vector, the second state vector, and the identified one or more differences.

9. The method of claim 1, wherein the one or more elements of the first state vector comprise kets, amplitudes, values, entanglement groups, phase information or mathematical operations associated with the first state vector.

10. The method of claim 1, wherein the one or more elements of the second state vector comprise kets, amplitudes, values, entanglement groups, phase information, or mathematical operations associated with the second state vector.

11. The method of claim 1, wherein determining the type of transition comprises:

comparing the generated transition information to one or more patterns characterizing one or more known types of transitions; and selecting a pattern of the one or more patterns that matches the generated transition information.

12. The method of claim 1, wherein determining the type of transition comprises applying one or more mathematical representations of one or more quantum operators to the first state vector.

13. A system for generating a complete quantum circuit from a text-based quantum algorithm, the system comprising:

a memory; and one or more processors;

wherein the memory stores one or more programs that, when executed by the one or more processors, cause the one or more processors to:

receive a text-based quantum algorithm to be performed by a quantum computing system, wherein the text-based quantum algorithm comprises a first state vector characterizing a first quantum state of one or more qubits and a second state vector characterizing a second quantum state of the one or more qubits;

generate a first syntax tree based on the first state vector, wherein the first syntax tree comprises one or more nodes representing one or more elements of the first state vector of the text-based quantum algorithm;

generate a second syntax tree based on the second state vector, wherein the second syntax tree comprises one or more nodes representing one or more elements of the second state vector of the text-based quantum algorithm;

generate transition information based on the first syntax tree and the second syntax tree, wherein the transition information characterizes a transition from the first quantum state to the second quantum state of the one or more qubits;

select, based on the generated transition information, a type of transition that characterizes the transition from the first quantum state to the second quantum state; and generate a complete quantum circuit based on the first and second state vectors, the generated first and second syntax trees, the generated transition information, and the selected type of transition, wherein the quantum circuit indicates the first quantum state characterized by the first state vector, the selected type of transition, and the second quantum state characterized by the second state vector.

14. The system of claim 13, wherein the first state vector is standardized prior to the generation of the first syntax tree.

15. The system of claim 13, wherein the second state vector is standardized prior to the generation of the second syntax tree.

16. The system of claim 13, wherein generating the first syntax tree comprises parsing the first state vector and identifying one or more elements appearing in the first state vector.

17. The system of claim 13, wherein generating the second syntax tree comprises parsing the second state vector and identifying one or more elements appearing in the second state vector.

18. The system of claim 13, wherein generating the transition information comprises one or more of: converting the first abstract syntax tree into a first list of superposition terms and converting the second syntax tree into a second list of superposition terms.

19. The system of claim 13, wherein generating the transition information comprises generating one or more of: a first metadata set associated with the first abstract syntax tree and a second metadata set associated with a second abstract syntax tree.

20. The system of claim 13, wherein generating the transition information comprises:

identifying one or more differences between the first syntax tree and the second syntax tree; and determining a pattern based on the first state vector, the second state vector, and the identified one or more differences.

21. The system of claim 13, wherein the one or more elements of the first state vector comprise kets, amplitudes, values, entanglement groups, phase information, or mathematical operations associated with the first state vector.

22. The system of claim 13, wherein the one or more elements of the second state vector comprise kets, amplitudes, values, entanglement groups, phase information, or mathematical operations associated with the second state vector.

23. The system of claim 13, wherein determining the type of transition comprises:

comparing the generated transition information to one or more patterns characterizing one or more known types of transitions; and selecting a pattern of the one or more patterns that matches the generated transition information.

24. The system of claim 13, wherein determining the type of transition comprises applying one or more mathematical representations of one or more quantum operators to the first state vector.

25. A non-transitory computer readable storage medium storing one or more programs for generating a complete quantum circuit from a text-based quantum algorithm, the programs for execution by one or more processors of an electronic device that, when executed by the device, cause the device to:

receive a text-based quantum algorithm to be performed by a quantum computing system, wherein the text-based quantum algorithm comprises a first state vector characterizing a first quantum state of one or more qubits and a second state vector characterizing a second quantum state of the one or more qubits;

generate a first syntax tree based on the first state vector, wherein the first syntax tree comprises one or more nodes representing one or more elements of the first state vector of the text-based quantum algorithm;

generate a second syntax tree based on the second state vector, wherein the second syntax tree comprises one or more nodes representing one or more elements of the second state vector of the text-based quantum algorithm;

generate transition information based on the first syntax tree and the second syntax tree, wherein the transition information characterizes a transition from the first quantum state to the second quantum state of the one or more qubits;

select, based on the generated transition information, a type of transition that characterizes the transition from the first quantum state to the second quantum state; and generate a complete quantum circuit based on the first and second state vectors, the generated first and second syntax trees, the generated transition information, and the selected type of transition, wherein the quantum circuit indicates the first quantum state characterized by the first state vector, the selected type of transition, and the second quantum state characterized by the second state vector.

26. The non-transitory computer-readable storage medium of claim 25, wherein the first state vector is standardized prior to the generation of the first syntax tree.

27. The non-transitory computer-readable storage medium of claim 25, wherein the second state vector is standardized prior to the generation of the second syntax tree.

28. The non-transitory computer-readable storage medium of claim 25, wherein generating the first syntax tree comprises parsing the first state vector and identifying one or more elements appearing in the first state vector.

29. The non-transitory computer-readable storage medium of claim 25, wherein generating the second syntax tree comprises parsing the second state vector and identifying one or more elements appearing in the second state vector.

30. The non-transitory computer-readable storage medium of claim 25, wherein generating the transition information comprises one or more of: converting the first abstract syntax tree into a first list of superposition terms and converting the second syntax tree into a second list of superposition terms.

31. The non-transitory computer-readable storage medium of claim 25, wherein generating the transition information comprises generating one or more of: a first metadata set associated with the first abstract syntax tree and a second metadata set associated with a second abstract syntax tree.

32. The non-transitory computer-readable storage medium of claim 25, wherein generating the transition information comprises:

identifying one or more differences between the first syntax tree and the second syntax tree; and determining a pattern based on the first state vector, the second state vector, and the identified one or more differences.

33. The non-transitory computer-readable storage medium of claim 25, wherein the one or more elements of the first state vector comprise kets, amplitudes, values, entanglement groups, phase information, or mathematical operations associated with the first state vector.

34. The non-transitory computer-readable storage medium of claim 25, wherein the one or more elements of the second state vector comprise kets, amplitudes, values, entanglement groups, phase information, or mathematical operations associated with the second state vector.

35. The non-transitory computer-readable storage medium of claim 25, wherein determining the type of transition comprises:

comparing the generated transition information to one or more patterns characterizing one or more known types of transitions; and selecting a pattern of the one or more patterns that matches the generated transition information.

36. The non-transitory computer-readable storage medium of claim 25, wherein determining the type of transition comprises applying one or more mathematical representations of one or more quantum operators to the first state vector.

\* \* \* \* \*